(12) United States Patent
Alger et al.

(10) Patent No.: US 7,925,548 B2
(45) Date of Patent: Apr. 12, 2011

(54) METHODS OF PURCHASING PRODUCTS THROUGH A CLIENT PORTAL

(75) Inventors: Jeffrey H Alger, Redmond, WA (US); Clifford O Guren, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 547 days.

(21) Appl. No.: 10/981,540

(22) Filed: Nov. 5, 2004

(65) Prior Publication Data

US 2005/0065860 A1 Mar. 24, 2005

Related U.S. Application Data

(62) Division of application No. 09/892,228, filed on Jun. 25, 2001, now abandoned.

(51) Int. Cl.
*G06Q 30/00* (2006.01)
(52) U.S. Cl. .... 705/27; 705/26.1; 705/26.61; 705/26.62
(58) Field of Classification Search .................... 705/26, 705/27
See application file for complete search history.

(56) References Cited

U.S. PATENT DOCUMENTS

| | | | |
|---|---|---|---|
| 5,664,110 A | | 9/1997 | Green et al. |
| 5,799,157 A | * | 8/1998 | Escallon ........................ 705/27 |
| 5,905,973 A | | 5/1999 | Yonezawa et al. |
| 6,029,141 A | | 2/2000 | Bezos et al. |
| 6,125,352 A | | 9/2000 | Franklin et al. |
| 6,246,997 B1 | | 6/2001 | Cybul et al. |
| 7,401,286 B1 | * | 7/2008 | Hendricks et al. ............ 715/203 |
| 2001/0042011 A1 | | 11/2001 | Preston |
| 2002/0120635 A1 | * | 8/2002 | Joao ............................. 707/200 |
| 2003/0069812 A1 | * | 4/2003 | Yuen et al. ...................... 705/27 |

OTHER PUBLICATIONS

"Internet Growth Driving Smart Appliance Market; Unit Sales to Top 20 Million by 2005 According to In-Stat" Business Editors and Technology Writers. Business Wire. New York: May 23, 2001. p. 1. Retrieved via ProQuest on Jan. 3, 2011.*
About BizRate.com, Nov. 29, 1999, Oct. 22, 2004 http://web.archive.org/web/20000229081019/bizrate.com/inside.xpml?rf=1.1:4.0.
Schafer, Ben J. et al., "Recommender Systems in E-Commerce," Proceedings of the 1$^{st}$ ACM conference on Electronic commerce (1999): 158-166.
RealNetworks Inc., RealPlayer 5.0, Washington: www.real.com, 1997.

* cited by examiner

*Primary Examiner* — Michael A. Misiaszek
(74) *Attorney, Agent, or Firm* — Shook, Hardy & Bacon L.L.P.

(57) ABSTRACT

A client portal that is optimized to fulfill a specific function. The portal can include a browser that is dedicated to performing a particular task, such as reviewing and purchasing electronic books. For example, to better perform the specific function, the browser may only be able to directly access sites designated by an authorized party, e.g., the browser's publisher. Because the browser is dedicated to performing a single task, the user interface for operating the dedicated browser may be simplified to include only those controls useful for performing the assigned task. Also, the content available for access by the client portal can be controlled by a single authorized party, such as the portal's publisher or distributor.

6 Claims, 7 Drawing Sheets

METHODS OF PURCHASING PRODUCTS THROUGH A CLIENT PORTAL

CROSS-REFERENCE TO RELATED APPLICATION

This application is a division of, and claims the benefit of priority to, application Ser. No. 09/892,228, filed Jun. 25, 2001 now abandoned, which application is incorporated entirely herein by reference.

FIELD OF THE INVENTION

The invention relates to a client portal optimized for fulfilling a specific function. More particularly, the invention is directed to a client portal for facilitating the performance of a specific task, such as purchasing a particular type of item or service (e.g., eBooks). The invention may be implemented, for example, by a browser or other application that is dedicated to performing a single task and which employs a user interface that is simplified to only those controls useful for performing the assigned task.

BACKGROUND OF THE INVENTION

Early in their evolution, computers employed operating systems such as MS-DOS® that used command line interfaces. That is, a user controlled these operating systems by typing specific commands on a command line. Similarly, the application programs that ran on these early computers used command line interfaces. While these operating systems and applications were very powerful, they required a user to know a number of different specialized commands in order to effectively operate a computer. The complexity of these commands severely limited the number of people who could use a computer. Many people who did not have the time or ability to learn the necessary commands were unable to operate these computers, or at least unable to operate them effectively.

As computers evolved, software developers created both operating systems and applications that were simpler to learn and use. For example, the Windows® operating system provided graphical user interfaces instead of command line interfaces. This allowed users to operate a computer simply by moving or activating icons. Also, instead of having to remember a specific command, a user could now activate a menu that would list all of the available commands. The user could then activate the desired command by, for example, moving a displayed cursor to the listing of that command and pressing an activation button (sometimes referred to as "clicking on" the command).

The Windows® operating system had a dramatic effect on the use of computers around the globe. Rather than having to learn a detailed list of user commands, a user could now employ almost any software application with only a rudimentary knowledge of that application and its underlying operating system. This revolution has opened the use of computers to a wide segment of the population, from small children too young to read to senior citizens. In turn, it has led to the exponential and ubiquitous use of computers in all walks of society.

Similarly, the development of the hypertext markup language (HTML) has spurred the growth of an entirely new economy implemented over computer networks, such as the Internet. While the Internet has existed in one form or another for decades, it was difficult for the ordinary person to navigate the Internet. Instead, a user typically had to be skilled in telnet and the file transfer protocol (FTP) to consistently obtain information over the Internet. With the advent of HTML and the World Wide Web, users now routinely employ browsers (i.e., software applications for retrieving and displaying markup language pages from the Internet) to perform almost every type of commercial transaction, including buying and reading books in electronic form.

This growth in the use of computers to conduct business over the Internet has created some problems, however. For example, in order to obtain content from the Internet, a user must employ a browser program, but these browser programs have become very complex. Part of the problem with these browser programs is that they must offer a generalized interface in order to accomplish a variety of tasks and goals. In order to perform this variety of tasks and goals, these browser programs must be complex, with a large number of commands and control options. Thus, many individuals still find this software difficult to use, and these people have been cut off from the benefits provided by the new digital marketplace.

Further, as more and more information is accessible over the Internet, it becomes more and more difficult to isolate information useful for a particular purpose. For example, a number of companies maintain Web sites for selling electronic books over the Internet. If a user does not know the specific Internet address for one of these Web sites, however, the user may have to employ a search engine to obtain one. Depending upon the user's search criteria, the search results produced by the search engine may include only a few useful Web sites, if any at all. Alternately, the search results may include several useful Web sites, but list these useful Web sites among so many other unrelated Web sites that the user must tediously parse through all of the results to identify those Web sites that are pertinent.

Moreover, once a user has located a useful Web site and would like to make a purchase, the process of making the purchase may be difficult or confusing for the user. For example, one merchant may require the user to submit a great deal of information, such as the user's age, education, occupation, email address, etc. Another merchant, on the other hand, may only require the user's credit card information and the delivery address. Some merchants may accept electronic cash, while still other merchants may accept only charges to a well-established credit card account. Further, some merchants may require a new user to set up a permanent account in order to make a purchase, while other merchants may allow a user to make a one-time purchase. Still further, if the user has not made a previous purchase from the merchant, the user may be uncertain as to the honesty of the merchant or the quality of the merchant's goods. Also, even after a user has located and accessed a useful Web site, the Web site may not have its information organized in a convenient fashion. Some merchants may provide a detailed description and image of each product, while other merchants may only give a list of its products, identifying each with only a short reference.

The wide variety in the access, use and format of different commercial Web sites make it difficult for some user's to employ multiple sites. Instead, many users locate only a few sites that they feel comfortable navigating and purchasing from, and then limit their future purchases to just those Web sites. Also, while some software for making purchases over the Internet (e.g., browsers) allow a user to save the Internet addresses of useful Web sites once they've been located, the addresses for these sites can be changed or deleted without updating the user's software. Thus, a user may be unable to identify a favorite Web site if its address is changed. Moreover, if a user is purchasing content for use with a software application, the user cannot do so in a single step. Instead, the user must separately locate the relevant content, purchase the content, download the content, and then integrate the content with the application, each in a different operation.

BRIEF SUMMARY OF THE INVENTION

The various embodiments of the invention relate to a device for making purchases over the Internet, i.e., a client portal, which is optimized for fulfilling a specific function or performing a particular task. For example, the client portal may be optimized for reviewing and purchasing electronic books (hereafter referred to as eBooks). To achieve this optimization, the client portal may have limited or specific functionality. Thus, the client portal may only access sites from a list of available sites preselected or maintained by an authorized party, such as the portal's publisher. Still further, some embodiments of a client portal according to the invention may only access those sites that offer the product that the portal is optimized to purchase (e.g., eBooks). Additionally, the portal may be implemented as part of an application (e.g., an eBook reader) such that the portal seamlessly retrieves content from a network and integrates the content into the application in a single operation.

Because the portal is dedicated to performing a specific task, the user interface for operating the dedicated portal may also be simplified to include only those controls useful for performing the assigned task. This interface simplification makes the dedicated client portal easier to use for the assigned task than, e.g., a general-purpose browser program. Further, dedicating the client portal to a specific task allows the authorized party to maintain a degree of control over the use of the portal, thereby permitting the authorized party to sell access through the client portal. Moreover, the authorized party can ensure that the merchants that maintain the preselected sites present their information in a consistent manner, so that the user can easily navigate all of the preselected sites. For example, the authorized party can ensure that all of the preselected sites selling eBooks organize the titles of the eBooks into catalogs based upon, e.g., genre, time period, authors, etc. Further, the authorized party can ensure that all of the merchants that maintain preselected sites are reputable, and employ consistent financial transactions for the purchase of their products.

DETAILED DESCRIPTION OF THE INVENTION

Devices for Implementing Various Embodiments of the Invention

Figure 1:
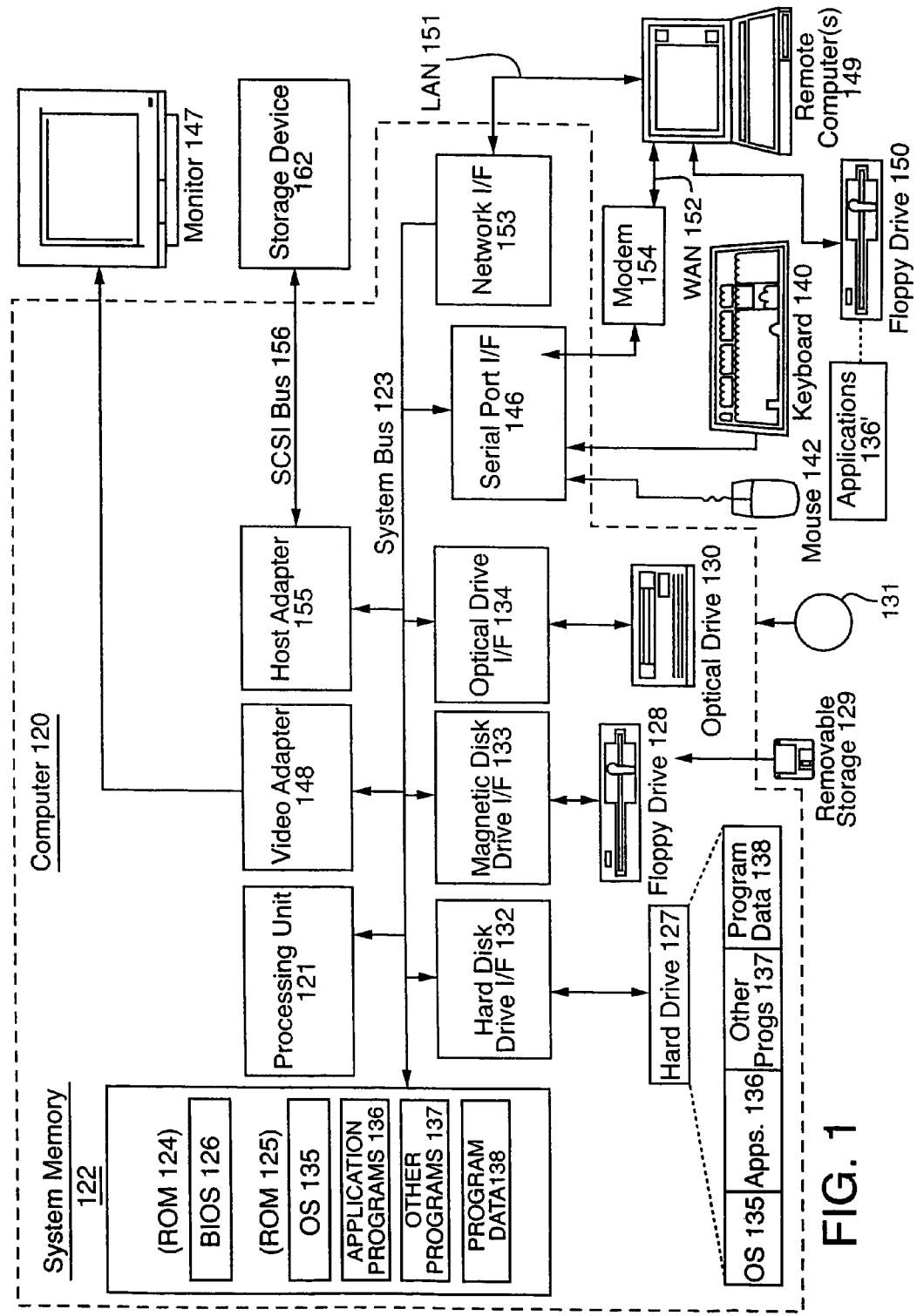
FIG. 1 schematically illustrates one possible computing device for implementing various embodiments of the invention.

Various embodiments of the invention can be implemented with computer systems, such as the exemplary computer system illustrated in FIG. 1. The system includes a general purpose computing device in the form of a conventional personal digital assistant, personal computer or network server 120 or the like, including a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during startup, is stored in ROM 124.

The personal computer or network server 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk-drive interface 133, and an optical drive interface 134, respectively. The drives and their associated computer-readable media provide non-volatile storage of computer readable instructions, data structures, program modules and other data for the personal computer or network server 120. Although the exemplary environment described herein employs a hard disk, a removable magnetic disk 129 and a removable optical disk 131, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk 127, magnetic disk 129, optical disk 131, ROM 124 or RAM 125, including an operating system 135 (e.g., the Windows CE, Windows® 2000, Windows NT®, or Windows 95/98 operating system), one or more application programs 136 (e.g. Word, Access, Pocket PC, Pocket Outlook, etc.), other program modules 137 and program data 138. A user may enter commands and information into the personal computer 120 through input devices such as a keyboard 140 and pointing device 142. Other input devices (not shown) may include a microphone, joystick, game pad, satellite disk, scanner, touch pad, touch screen, or the like. These and other input devices are often connected to the processing unit 121 through a serial port interface 46 that is coupled to the system bus 123, but may be connected by other interfaces, such as a parallel port, game port, universal serial bus (USB), or a 1394 high-speed serial port. A monitor 147 or other type of display device is also connected to the system bus 123 via an interface, such as a video adapter 148. In addition to the monitor 147, personal computers typically include other peripheral output devices (not shown), such as speakers and printers.

The personal digital assistant, personal computer or network server 120 may operate in a networked environment using logical connections to one or more remote computers, such as a remote computer 149. The remote computer 149 may be another personal digital assistant, personal computer or network server, a router, a network PC, a peer device or other common network node, and typically includes many or all of the elements described above relative to the personal computer 120, although only a memory storage device 150 has been illustrated in FIG. 1. For example, a personal digital assistant using a Windows CE operating system can operate as a standalone computer, or as a connected extension of a personal computer. The logical connections depicted in FIG. 1 include a local area network (LAN) 151 and a wide area network (WAN) 152. Such networking environments are commonplace in offices, enterprise-wide computer networks, Intranets and the Internet.

When used in a LAN networking environment, the personal digital assistant, personal computer or network server 120 is connected to the local network 151 through a network interface or adapter 153. When used in a WAN networking environment, the personal digital assistant, personal computer or network server 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal digital assistant, personal computer or network server 120, or portions thereof, may be stored in the remote memory storage device 150. It will be appreciated that the network connections shown are exemplary and other means of establishing a communications link between the computers may be used.

Conventional Browsers

As is well known in the art, a browser is a software program that can be implemented on a computer system that allows a user to view (or "browse") documents written in the hypertext markup language (HTML), as well as other files and software related to those HTML documents. While browsers are typically used to access Web pages over the Internet (i.e., HTML documents residing on computer servers using the Hypertext Transfer Protocol), those of ordinary skill in the art will appreciate that browsers can also be used to browse information from other sources, such as other networks, an intranet, or the local hard drive. Conventional browsers are also typically capable of downloading files, transferring files, displaying graphic images embedded in a HTML document, and executing programs such as Java™ applets or ActiveX® controls. Accordingly, browsers are often used to purchase goods or services over the Internet. For example, a user may use a browser both to select an item for purchase from a Web page provided by merchant, and then to provide credit card information to the merchant to complete the purchase.

Figure 2:
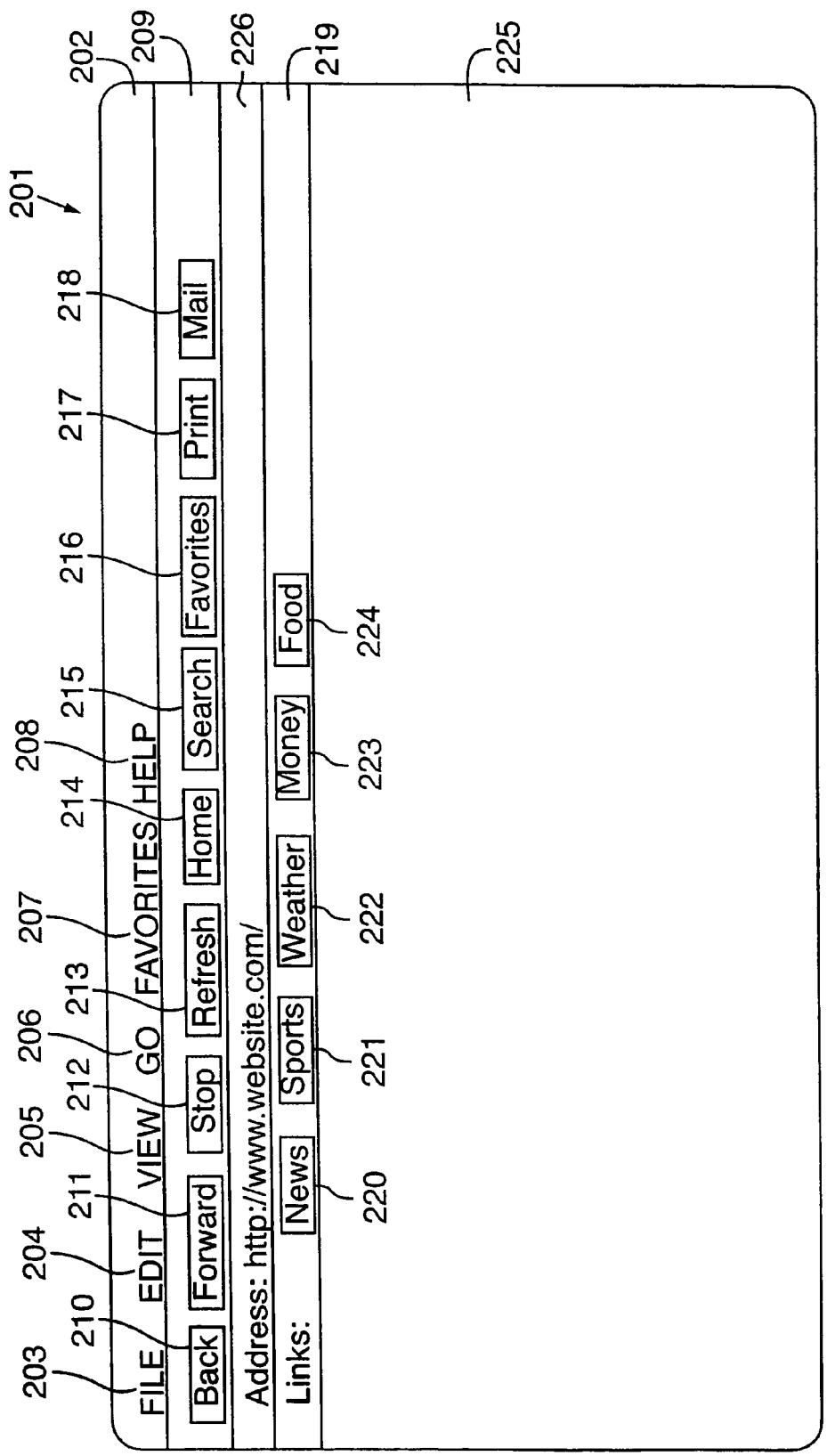
FIG. 2 shows a generic user interface for a conventional browser.

FIG. 2 shows a generic user interface 201 for a conventional browser. As seen in this figure, the browser interface 201 includes a first task bar 202 with a number of command buttons 203-208 entitled "File," "Edit," "View," "Go," "Favorites," and "Help," respectively. The interface 201 also includes a second task bar 409 with still more command buttons 210-218, entitled "Back," "Forward," "Stop," "Refresh," "Home," "Search," "Favorites," "Print," and "Mail," respectively, and a third task bar 219, with command buttons 220-224 entitled "News," "Sports," "Weather," "Money," and "Food," respectively. These commands allow the browser to perform a variety of functions. For example, activating the "Edit" command button 204 may produce a command menu that includes commands allowing a user to cut text or images from a document, paste text or images to a document, delete text or images from a document, or select text or images in a document for any of these procedures. Similarly, activating the "Favorites" command button 216 will provide the user with a list of Universal Resource Locator (URL) addresses for previously selected Web sites. Activating the "Home" command button 222 might cause the browser to retrieve and display a preselected Web page that the user has designated as a default page.

The browser interface 201 also has a display portion 225 for displaying retrieved documents, and an address line 226. The address line 226 allows a user to enter the URL address of a HTML document (hereafter referred to as a page or Web page for convenience only) to be retrieved by the browser. As is known in the art, the URL defines a request for a specific page, document or file stored on a server computer in the network. The browser then sends this request to a router for the network, which uses the URL address to pass the request onto the appropriate server computer with the desired page, object or file. While the address line allows a user to retrieve any accessible Web page, if the user mistypes the URL then the browser may retrieve an incorrect page or fail to retrieve a page altogether.

A Client Portal According to One Embodiment of the Invention

Figure 3:
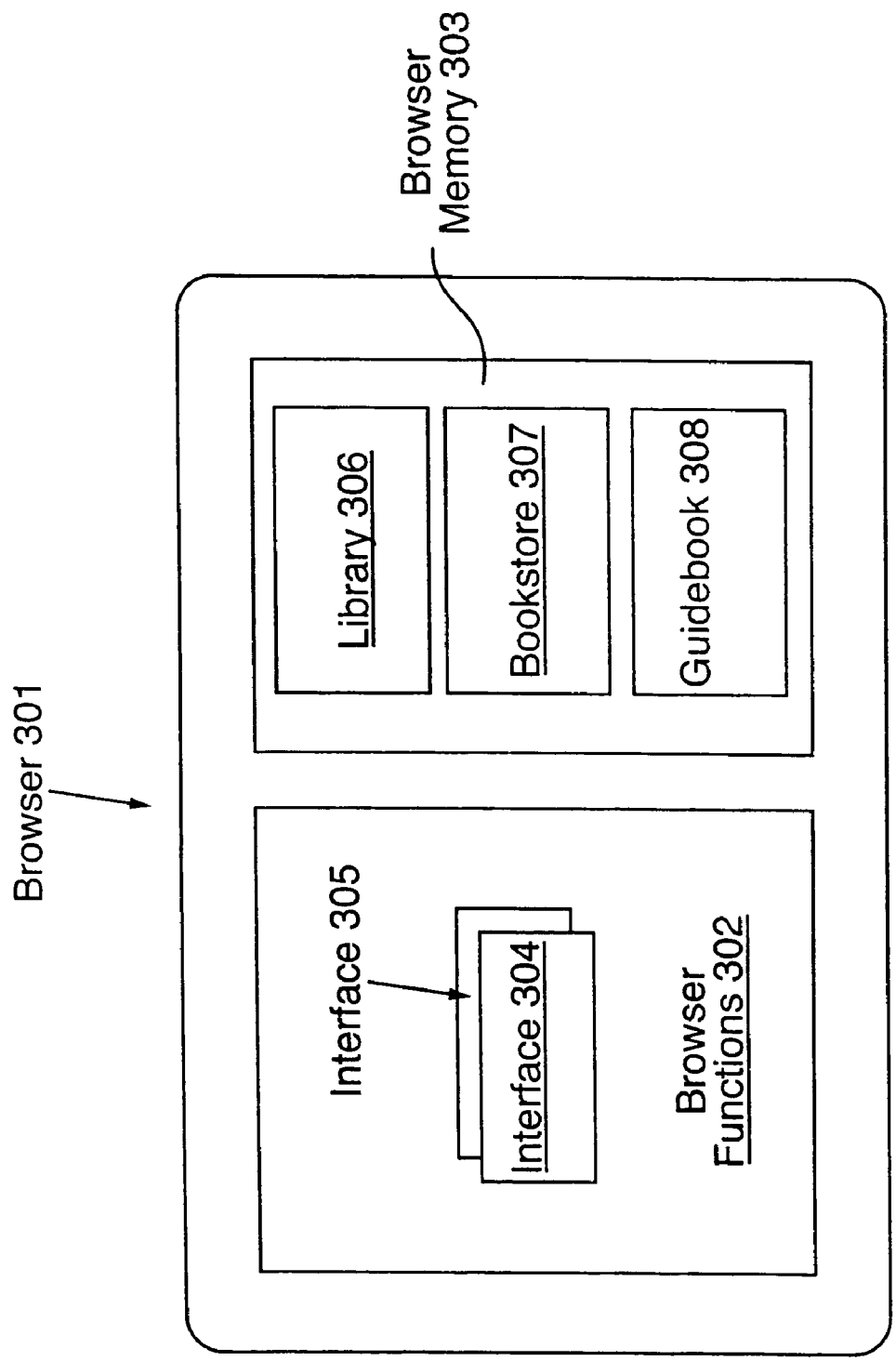
FIG. 3 schematically depicts a dedicated client portal according to one embodiment of the invention.

FIG. 3 schematically depicts a dedicated client portal 301 according to one embodiment of the invention. As seen in this figure, the client portal 301 includes a set of operating functions 302 and a memory 303. The client portal 301 provides access to obtain and convey information over a network such as the Internet. In order to provide this access, the operating functions 302 may include many of the functions typically associated with a conventional browser. For example, the operating functions 302 may include all of the functions necessary to operate a browser as known to those of ordinary skill in the art. The operating functions 302 for this particular embodiment of the invention also preferably include objects to provide at least two user interfaces, interface 304 and interface 305. Each of these interfaces will be discussed in greater detail below.

The embodiment of the client portal 301 illustrated in FIG. 3 is specifically for the sale and subsequent viewing of eBooks. More particularly, the client portal 301 is an expression of a browser in a rendering application for displaying eBooks. The portal memory 303 for this particular embodiment of the invention preferably has at least three portions, entitled "Library 306," "Bookstore 307," and "Guidebook 308." Each of these portions also will be explained in greater detail below as well.

All of the various components of the client portal 301 may reside on a single memory medium for a local computer like that described above with reference to FIG. 1. Alternately, portions of the client portal 301 may be divided among different memory media for a local computer (i.e., it may be divided between RAM and ROM memories, between a hard drive and a RAM memory, etc.), or even among memory media for the local computer and memory media residing with a remote computer. For example, while the operating functions 302 may reside on a local computer, the Bookstore 307 portion of the portal memory 303 may reside on a remote computer connected to the local computer via a network, such as the Internet. Similarly, the Library 306 and/or Guidebook 308 portions of the portal memory 303 may also reside on a remote computer connected to the local computer via a network. Some embodiments of the invention may even have the entire memory 303 located on a remote computer connected to the local computer via a network. Those of ordinary skill in the art will appreciate that a number of possible variations in the location of the components of the portal 301 are possible.

Those of ordinary skill in the art will also appreciate that one or more of the components of the portal 301 may be shared with or borrowed from other software programs. For example, because the client portal 301 may perform many of the functions typically associated with a conventional browser, portions of the operating functions 302 may be shared with, or borrowed from, a browser program employed by the local computer, such as Microsoft Internet Explorer.

In order to streamline the operation of the client portal 301 and simplify its use for consumers, the functions 302 of the client portal may preferably be limited to only those necessary to perform a specific task. For example, if the client portal 301 is configured to purchase a particular type of goods or services (e.g., eBooks) over a network such as the Internet, the client portal 301 may limit the user's access to points on the network to only those that offer the particular type of goods or services for purchase. Further, the client portal 301 may provide the user with user interfaces that include only the commands necessary to examine and purchase that particular type of goods or services.

The client portal 301 may also limit the user to the purchase of goods or services from particular vendors. This allows the publisher or distributor of the client portal 301 to restrict the use of the portal 301 to purchases from only those vendors that, e.g., are trustworthy, have an agreement with the publisher or distributor, etc. Thus, the client portal 301 may be seen as a filter that filters out extraneous information for the user, thereby providing the user with only the information the user needs to purchase the particular type of goods or services from particular vendors for which the client portal 301 has been configured.

One exemplary embodiment of the client portal 301, as shown in FIG. 3, is for use as part of a reader for purchasing and subsequently reading eBooks, as previously mentioned. Accordingly, when a user activates the client portal 301 according to this embodiment of the invention, the operating functions 302 operate to provide the user with the user interface 304, shown in FIG. 4. As seen in this figure, the user interface 304 is much simpler than the user interface 201 for a conventional browser shown in FIG. 2. For example, the client portal interface 304 shown in FIG. 4 only has three display areas. Display area 401 displays the content retrieved by the client portal 301, display area 402 displays the title of the content retrieved by portal 301, and display area 403 shows the "page number" of the content currently being displayed in display area 401.

In addition, the operating functions 302 of the client portal 301 may be configured in any way useful to provide features that facilitate the particular use for the client portal 301. Thus, in the above-described embodiment for reading and viewing eBooks, the operating functions 302 may display the content retrieved by the client portal 301 in a manner similar to that of actual paper books or catalogs. For example, the operating functions 302 may divide the retrieved content into individual page segments with corresponding page numbers. A user may then skip to the next (or previous) sequential page segment by activating the page turn command 408 (to be discussed below), instead of having to scroll through the content as with a conventional browser. Further, the user may access a specific portion of the retrieved eBook simply by referring to its page number.

The interface 304 includes a "Library" command button 404, which instructs the portal 301 to retrieve the contents of the Library 306 portion of the memory 303. The Library 306 contains a listing of the eBooks and other content accessible to the portal 301 for viewing by the user. For example, if the user has previously employed the portal to download, e.g., *Tom Sawyer* by Mark Twain, *The Inferno* by Dante, the *King James Bible* and the October, 2000 issue of *Slate* magazine, each of these items will be listed in the Library 306. This listing may be contained, for example, in an eBook page, a HTML page, a XML page or in a page of any other suitable type of format for rendering content in the Library 306 portion of the memory 303. For example, as is known in the art, one well-known eBook format, commonly referred to as the ".lit" format, is a variant of the HTML format that has been converted to a binary listing. These content rendering formats, including the ".lit" format, will be well known to those of ordinary skill in the art, and thus will not be discussed here in further detail.

Accordingly, when the user activates the "Library" command button 404, the client portal 301 retrieves and displays the page of content listing each of these items. This content page (not shown) may also preferably contain a link to each listed item, so that the user can retrieve a desired item for viewing simply by activating the link. It should be noted that an item listed in the Library 306 portion of the memory 303 may represent content that has actually been downloaded by the client portal 301 for viewing. With some embodiments of the invention, an item may alternately represent content for which the client portal 301 has only obtained the information (e.g., password information) necessary to download the content in the future.

Figure 4:
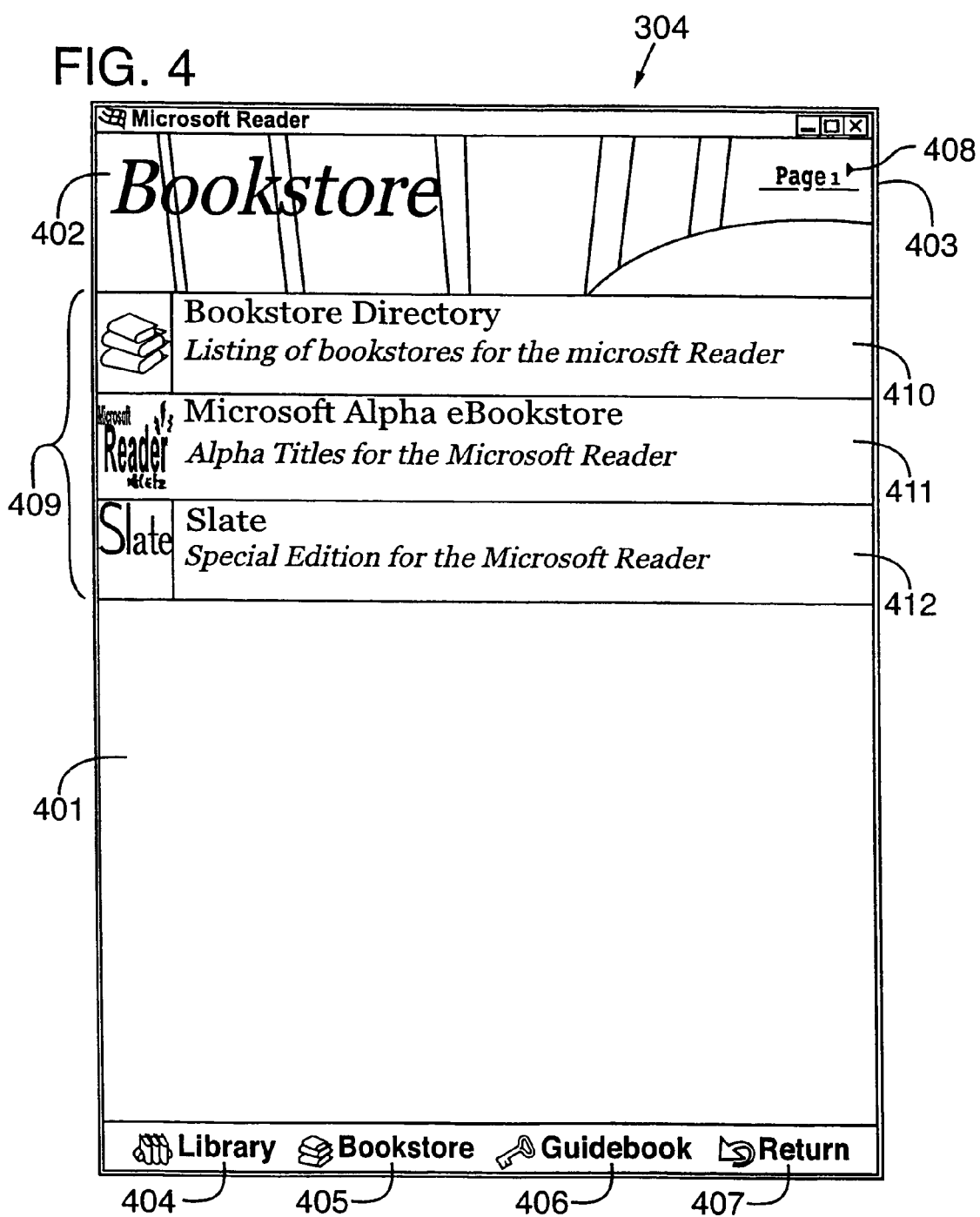
FIG. 4 shows a first user interface according to one embodiment of the invention.

Like the "Library" command button 404, the "Bookstore" command button 405 causes the portal 301 to retrieve the contents of the Bookstore 307 portion of the memory 303. The Bookstore 307 portion of the memory 303 contains a listing of the locations (e.g., Web pages or Web sites) accessible to the client portal 301 for obtaining new content. This listing may be, for example, a set of Web sites displayed in the eBook page 409 as shown in FIG. 4. Accordingly, when the user activates the "Bookstore" command button 405, the portal 301 retrieves the eBook page 409 listing each of the accessible Web pages or Web sites. Each listing on this eBook page 409 may also preferably be a link to the listed Web page or site, so that the user can instruct the portal 301 to access and display a desired page or site for viewing simply by activating the listing of the site on the eBook page 409.

The "Guidebook" command button 406 causes the client portal 301 to retrieve the contents of the Guidebook 308 portion of the memory 303. Preferably, the Guidebook 308 portion contains an instruction manual explaining the operation of the client portal 301. The "Return" command button 407 causes the client portal 301 to display the most recently displayed content (i.e., the content displayed just prior to the currently displayed content.)

As previously noted, the user interface 304 also provides the page up/down button 408, which is located in the display area 403. This button 408 advances the view of the content displayed in the display area 401 in page-sized increments, just as with a conventional paper book. It should be noted that the use of page increments to view rendered content, rather than using conventional scrolling, is more familiar to users who are accustomed to turning individual pages in a book or catalog. Thus, the use of consistently-sized page increments is yet another feature of some embodiments of the invention that serves to facilitate commercial transactions over a communications network such as the Internet.

In the example shown in FIG. 4, the display area 401 displays the first "page" of the contents of the Library 306, so the page up/down command button 408 appears as a single arrow in the display area 403. Of course, as known to those of ordinary skill in the art, if the second or subsequent "page" of the contents of the Library 306 were displayed, then the page up/down command button 408 would appear as two oppositely directed arrows.

It should be noted that the client portal interface 304 does not have an address line that would allow a user to type in a URL as with a conventional browser to access new content (i.e., content that has not been previously stored in the client portal's memory). Rather, as previously indicated, the user activates the "Bookstore" command button to retrieve the eBook or HTML page 409 listing the Web pages or sites that are accessible to the portal 301 for retrieving new content. The particular page 409 shown in FIG. 4 contains three site listings 410-412. To access any of these Web pages or sites, the user simply activates the link to that site contained in its listing. This causes the client portal 301 to send the URL for the listed page or site to a router and onto the appropriate server to obtain that page or site.

It should also be noted that the page 409 does not provide a mechanism for a user to add new Web sites to its list of accessible sites (although the interface 304 may allow a user to activate a command to delete a Web site from the list, as is know in the art). Instead, the page 409 also includes a listing 410 for a Web site entitled "Bookstore Directory." To add a new site to the Bookstore 307 portion of the client portal memory 303, the user must first access the "Bookstore Directory" Web site by activating the bookstore directory site listing 410, as will be explained below. Thus, in order to access a new Web page whose address was not originally stored in the client portal memory 303, the user must obtain the address for the new Web page from the bookstore directory site.

Figure 5:
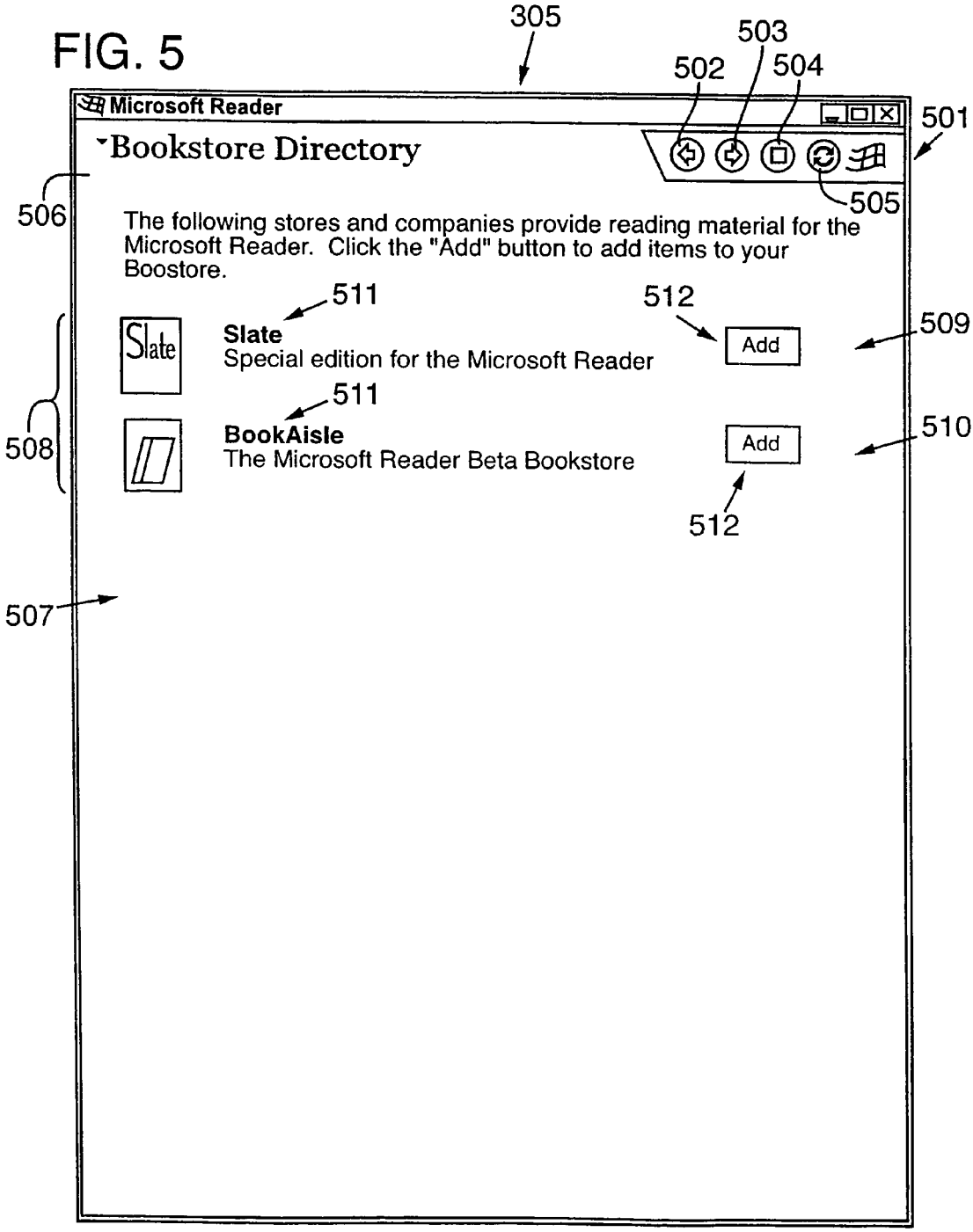
FIG. 5 shows a second user interface according to one embodiment of the invention.

When the user activates the bookstore directory site listing 410, the client portal 301 retrieves the content from the Bookstore Directory site, and displays the retrieved content using the interface 305 as shown in FIG. 5. As seen in this figure, the interface 305 does not include any of the command buttons 404-407 of the first interface 304. Instead, the interface 305 has a navigation bar 501 with four navigation command buttons 502-505: the "back" command button 502, the "forward" command button 503, the "stop" command button 504 and the "refresh" command button 505. These command buttons and their functions are well known with respect to conventional browsers, and thus will not be described in detail. The interface 305 also includes a first display area 506 for displaying the name of the retrieved content and a second display area 507 for displaying the retrieved content itself.

As also shown in FIG. 5, the content 508 of the Bookstore Directory site may be interactive, i.e., it may accept commands from the user in addition to simply displaying information. For example, the content 508 illustrated in FIG. 5 includes two listings 509 and 510 of new Web sites available to the client portal 301 (i.e., Web sites that are not listed in the bookstore page 409, but which may still be accessed through the client portal 301). Each listing includes the name 511 for the Web site and an activation button 512. When the user wants to add a link to or a URL for the listed Web site to the bookstore page 409, the user selects the activation button 512 corresponding to the name 511 of the desired title. This causes the name and URL for the Web site (and any other pertinent information) to be downloaded to the client portal 301 and stored in the Bookstore portion 307 of the portal memory 303 for future inclusion on the list 409 of sites accessible to the client portal 301.

In this manner, a user unfamiliar with the operation of a conventional browser can easily add new sites accessible to the client portal 301 of the invention. At the same time, the user can maintain some control over the list 409 of sites accessible to the client portal 301. For example, if the page 508 listing the available locations or sites includes fifty different vendors, the user may select only one or two of his or her favorite vendors for access through the client portal 301. Thus, by giving the user control to limit the number of possible vendors from page 508 to those selected for the list 409, the invention allows the user to avoid being overwhelmed by a large number of possible vendors on the page 508. Further, the distributor or publisher of the client portal 301 can change or update the listing the locations or sites available for access by the client portal 301 at any time, without the need to contact the client portal 301, simply by changing or updating the content of page 508. Still further, the publisher or distributor of the client portal 301 (or other authorized party) can determine which network locations or sites are available for access by the client portal 301. As will be discussed in detail below, this control of access provides a number of benefits for both the client portal's user and its publisher or distributor (or other authorized party).

It should be noted that, with these embodiments of the invention, the user of the reader does not need to obtain content for the reader using a separate application (e.g., a browser) and then integrate the content into the reader for viewing in a separate operation. Instead, content retrieved by the client portal 301 is seamlessly integrated into the rendering portion of the eBook reader for display in the interface 304 or the interface 305. That is, with these embodiments, the retrieved content is displayed in the interface 304 or the interface 305, and manipulated using only the simplified set of commands provided in these interfaces rather than with the numerous commands that are provided in a conventional browser. Thus, if the retrieved content is the Bookstore Directory site, the contents of this site are seamlessly displayed by the reader in interface 305 similar to the display of an eBook in interface 304. Likewise, if the retrieved content is, e.g., a catalog of eBooks available to purchase from one of the sites listed on the Bookstore Directory site, the catalog is displayed in the interface 305 similar to the display of an eBook in interface 304.

Accordingly, with a client portal according to these embodiments of the invention, a user does not need to obtain content from a browser in a first operation, and then transfer the content to the application that will employ the content in a second, separate operation. Of course, this feature of the invention is not limited to the purchase and reading of eBooks. For example, other embodiments of the invention can be used with a media player application for playing back electronic media (e.g., for audibly playing MP3 files, visually displaying JPEG files, etc.). With these embodiments, a user can employ the client portal 301 according to the invention to list only Web sites that offer electronic media, and then to retrieve content from these sites directly into the media player.

While the embodiment of the invention described above advantageously employs the Bookstore Directory content 508 to list network locations or sites available for access by the client portal 301, those of ordinary skill in the art will appreciate that other embodiments of the invention can omit this feature. For example, other embodiments of the invention may arrange for the Bookstore page 409 to automatically include all of the sites or locations available for access by the client portal 301, without allowing the user to select the sites or locations appear on this page.

As previously noted, the specificity of the Web site access permitted to the client portal 301 provides a number of benefits to both the portal user and to the publisher or distributor of the client portal 301. For example, limiting access to particular sites allows the portal 301 to be optimized for its particular task, such as retrieving and viewing eBooks. The party authorized to maintain the Bookstore Directory Web site, e.g., the publisher or distributor of the client portal 301, or another authorized party such as a merchant affiliated with the publisher or distributor of the client portal 301, can ensure that all of the new sites accessible through the bookstore directory offer eBooks for downloading to the portal 301. Thus, if a merchant wants to begin selling goods or services compatible with the specific purpose of the client portal 301 (e.g., eBooks), the authorized party can add that merchant's Web site to the list 508. Similarly, if a listed merchant decides to no longer provide goods or services for the client portal 301, the authorized party can delete that merchant's Web site from the list 508. This relieves the user of the need to search for sites offering eBooks, or to maintain a list of favorite sites offering eBooks.

Further, having the authorized party retain control over the use of the client portal 301 empowers the authorized party to maintain the quality and consistency of the sites accessible through the client portal 301. It also allows the authorized party to collect information on the user's preferences (i.e., the user's tastes in literature), in order to assist the user in accessing other desirable content. For example, the publisher or distributor of the client portal 301 may be able to determine that a user favors books in a particular genre of literature, such as horror novels. The publisher or distributor can then make other content available for access through the client portal 301 that may be of interest to that user, such as a catalog for purchasing Goth-style clothing or a catalog for purchasing horror movies on VHS or DVD. For example, if the user purchases a book on birds of North America, the publisher or distributor can offer the user the opportunity to purchase a book on the flowers of North America. Similarly, if a publisher of a medical textbook can include a link within that content that provides an offer to the user to purchase a medical terminology dictionary. Thus, by retaining control of the content available for access by the client portal 301, the publisher or distributor of the client portal 301 (or other authorized party) can effectively cross-market merchandise from different vendors for the benefit of the user.

Still further, permitting the publisher or distributor or other authorized party to retain control over the sites accessible through the client portal 301 allows the publisher or distributor or other authorized party to remove accessible content from that the user does not regularly view. For example, if the client portal 301 is optimized for the purchase of clothing, it may initially be able to access content including catalogs for the purchase of children's clothes. If the user is, e.g., a college student, however, he or she may not ever use the client portal 301 to purchase children's clothes. When the publisher, distributor, or other authorized party determines that the user does not use the client portal 301 to purchase children's clothes, it may then remove the portal's access to the catalog for children's clothes, and provide the portal 301 with access to a vendor's catalog for college-aged clothes instead.

Thus, the portal 301 distributor, publisher or other authorized party can manage the content access available to the client portal 301 much like a landlord manages the tenants renting space from a shopping mall. The distributor, publisher or other authorized party can limit the access of the client portal 301 to the purchase of a particular type of item (e.g., eBooks), or to making purchases from a particular group of vendors (e.g., those vendors that have affiliated themselves with the distributor, publisher or other authorized party). Further, with some embodiments of the invention, the distributor, publisher or other authorized party can tailor the "tenants" of the "mall" to match the buying habits of the user.

Catalogs for Purchasing Items Using the Client Portal According to the Invention Returning now to FIG. 4, a user can access either of the sites identified in listing 411 and 412 to purchase goods or services with the client portal 301 (in this example, to purchase eBooks). In some embodiments of the invention, the client portal 301 can display the content of these purchase sites using the interface 305. With other embodiments of the invention, the client portal 301 may display the content of these purchase sites using an interface for a conventional browser, such as the browser interface 201 shown in FIG. 2.

As previously discussed, because the client portal 301 according to the described embodiment of the invention may only access sites selected by an authorized party, that authorized party may be able to control the format of those accessible sites. This allows the authorized party to provide the user with consistent formatting, so that a user will be able to easily navigate through any site accessed through the client portal 301.

One preferred format for presenting content at the purchase sites is electronic catalogs. For the purposes of this application, an electronic catalog is a sequential listing of information for items, where the position of the information for each item bears some relationship to the previously described item and the next sequentially described item. For example, as with conventional paper catalogs, an electronic catalog is arranged into a series of sequential pages. The items described in the catalog are then arranged in some type of specific order, so that the catalog's merchant can tell a particular "story" about its product. For example, a book vendor may want user to view the current bestseller's first, and then view its seasonal books (e.g., horror books for Halloween) next. It may then want users to be able to view its entire library according to selected genre categories. Another book vendor, however, may users to view its sale items first, and then view the current bestsellers.

Because the electronic catalogs according to the invention present the items for purchase in a sequential order designated by the merchant, both merchants can have a user sequentially view its products in the order in which it desires. This arrangement is different from conventional product disclosures, which list available products using HTML pages. With these conventional HTML listings, a user jumps from product to product in a random order. Of course, according to the electronic catalogs of the invention, a user can view a particular product out of sequence by using a table of contents to skip ahead to the particular page on which that product is described. In the normal course of leafing through the catalog, however, the user will view the merchant's products in the particular order desired by the merchant.

Figure 6:
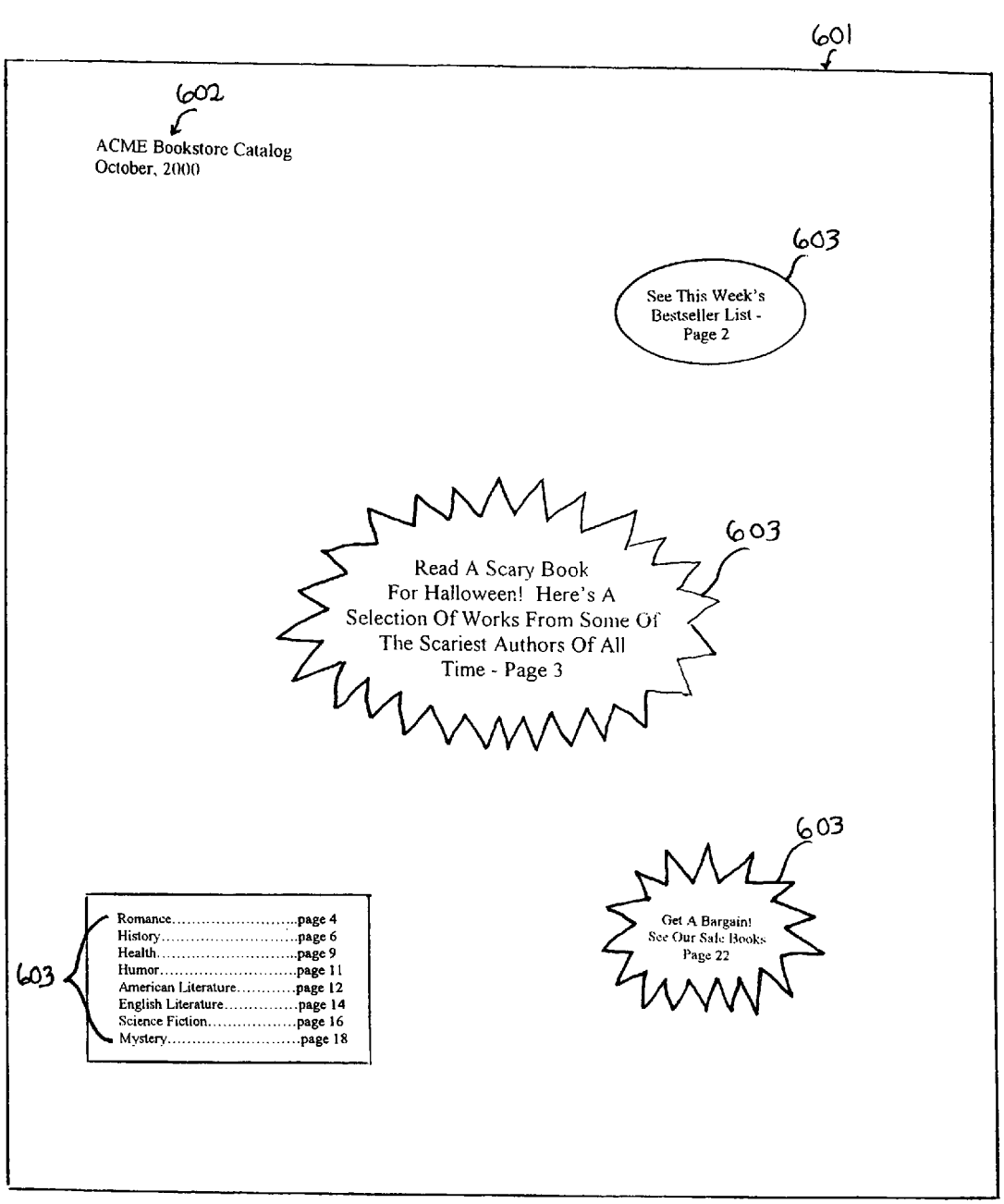
FIGS. 6 and 7 illustrate catalog pages from a catalog for obtaining items for purchase according to embodiments of the invention.

In addition to allowing a merchant to display its items to a user in a particular sequence, by arranging the available products into catalogs, a user can also more easily navigate through the catalogs to locate items the user desires to purchase. FIG. 6 shows a first page 601 of one possible electronic catalog for selling eBooks. The catalog page 601 may be an eBook page, an HTML page, or a page written in some other suitable content rendering format. As seen in FIG. 6, the page 601 may include the name or brand 602 of the merchant selling the eBooks (e.g., the merchant maintaining the purchase site) and a list of a number links 603 to other pages in the catalog. When the user identifies the page of a subject of interest, the user then activates the link 603 for that page. This causes the client portal 301 to retrieve the page for that particular subject.

As can be seen from page 601, the contents of the catalog are arranged according to a particular order desired by the merchant. In particular, the first items listed in the catalog are the current week's bestselling books, followed by horror books for Halloween sales. The merchant's regular library of books are then displayed, starting with romance books on page 4 and ending with mystery books on page 18. Lastly, the sale books are listed on page 22. Accordingly, a user that sequentially views the pages of the catalog will view the items offered by the book merchant in the particular order desired by the merchant. Alternately, if the user sees a particular category of item he or she wants to view out of order, the user can activate the link 603 associated with that category or subject to view it immediately.

Figure 7:
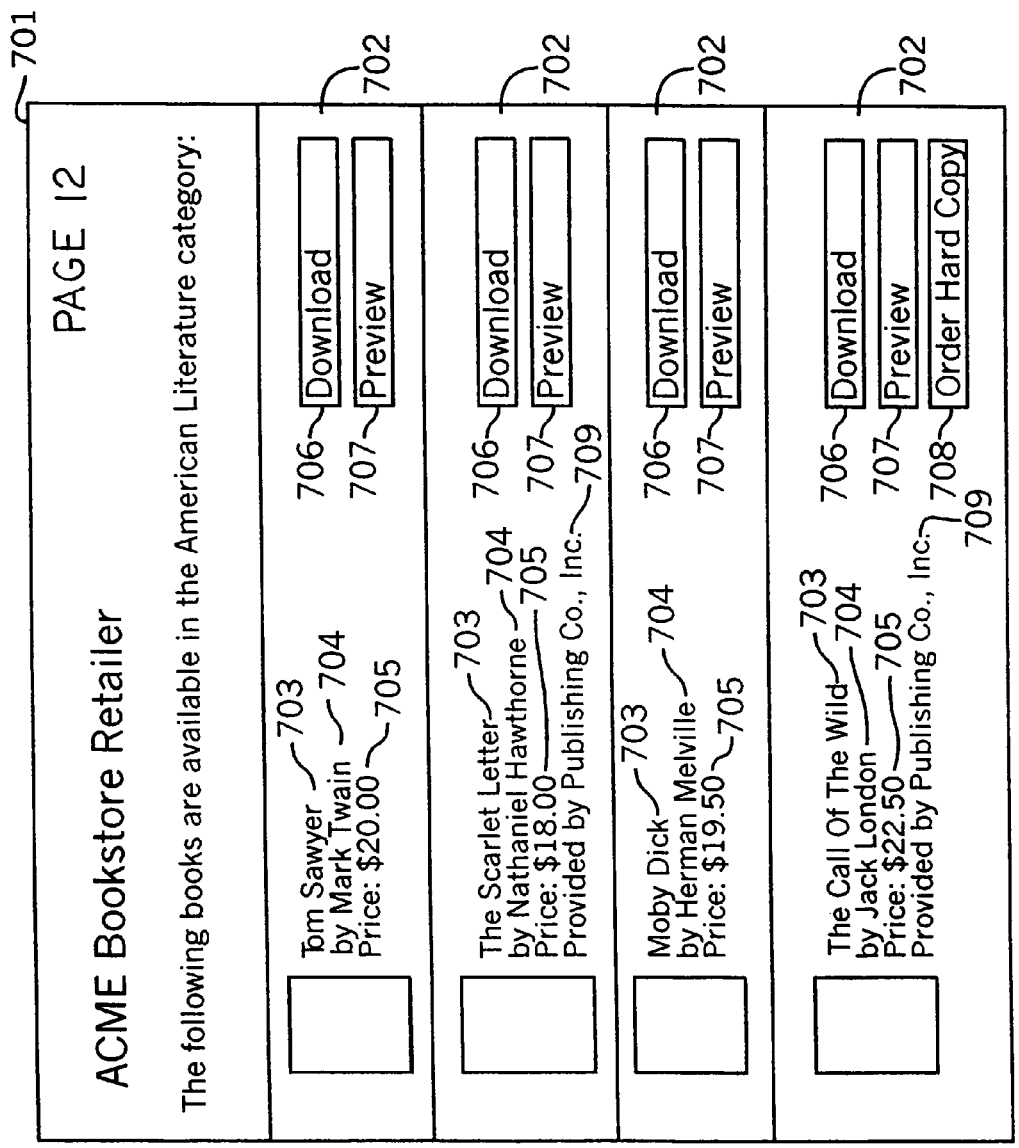

FIG. 7 illustrates one example of another catalog content page 701 (numbered as catalog page 12 on the content page 601 described above). As seen in this figure, content page 701 displays books in the American Literature genre. It includes an eBook listing 702 for each eBook available in the catalog 701. Each listing 702 may include the eBook's title 703, the eBook's author 704, the eBook's price 705, and a download command button 706 for instructing the client portal 301 to purchase and download the eBook for viewing. Each listing 702 may further include a preview command button 707 instructing the client portal 301 to download a preview of the eBook (e.g., a free copy of the first chapter) and a hard copy command 708, instructing the client portal 301 to order a paper copy of the eBook from the merchant. The hard copy command 708 may further advantageously instruct the client portal 301 to download some or all of the eBook for viewing in addition to ordering the hard copy, so that the user may begin reading the eBook immediately without having to wait until the hard copy is delivered.

The listing 702 can also include a name 709 of the actual supplier of the eBook if it is different from the merchant maintaining the purchase Web site. While the merchant maintaining the purchase site and catalog pages 601 and 701 may provide the cataloged eBooks for downloading to the client portal 301, this is not necessary. Instead, the download command button 706 for an eBook may actually instruct the client portal 301 to download the eBook (or a preview of the eBook for the preview command button 707) from another location, such as a Web site maintained by the actual publisher of the eBook or a Web site maintained by another merchant. Thus, a catalog 701 may include eBooks that are actually retrieved from a number of different locations. This feature allows the merchant maintaining the purchase Web site a great deal of flexibility in creating its catalog of available eBooks. Also, while the merchant maintaining the purchase Web site may include a name 708 for the actual publisher of the eBook, the merchant may also choose not to display this information to the user, so that it appears that all of the eBooks are provided directly by that merchant. This feature allows the merchant a great deal of flexibility in presenting its brand image, either as a broker or as an original retailer. Further, a publisher of eBooks can maintain a purchase site for its published eBooks, but identify one or more merchants as sources for the eBooks to the user.

The merchant maintaining the purchase site and catalogs 601 and 701 may also tailor the catalogs 601 and/or 701 to the individual user. As previously noted, when the user activates a listing 411 or 412 for a purchase site, the client portal 301 sends out the URL for that site over the Internet (or other network) to the computer server on which that site is maintained. The client portal 301 can include an identifying header with that URL, so that the merchant maintaining the purchase site can recognize that a particular user is requesting the content. This allows the merchant to collect information from the user, such as the user's preferences in eBooks, to prepare a profile of the user's preferences and purchase habits. The merchant can use the user's profile to then tailor the content provided to the client portal 301 when the user accesses the merchant's Web site.

For example, if a user's profile indicates that the user typically purchases only biographical eBooks, science fiction eBooks and American literature eBooks, then the merchant can provide the user with a genre catalog 601 including only these genres and an option to view an expanded genre catalog 601. Alternately, the merchant may provide the user with a detailed catalog 701 including popular eBooks in all three of these genres. As previously noted, the distributor or publisher of the client portal 301 (or other authorized party charged with determining the access available to the client portal 301) can modify the content offered to the user through the portal 301 based upon the user's profile. Those of ordinary skill in the art will appreciate that a wide variety of options are possible.

It should also be noted that the user's profile may include purchase information for the user. For example, the profile may include credit card information for a credit card account frequently employed by the user to purchase goods or services through the client portal 301, the delivery method preferred by the user, the user's email and postal address, etc. The merchant can use this profile information to more conveniently allow the user to purchase goods or services through the client portal 301.

It should also be noted that, with some embodiments of the invention, a user can employ the client portal 301 to purchase items from a merchant even when the client portal is not connected to the network hosting the merchant's site. For example, when the client portal 301 is connected to the network hosting the merchant's site, the portal 301 can download an electronic catalog provided by the merchant into the memory 303. The user can then access the catalog offline from the network (either directly through the Library 306 or through the Bookstore 307), and make purchases from the catalog. The portal 301 will record the user's purchases until it reconnects to the network hosting the merchant's site. The client portal 301 then conveys the purchase to the merchant to complete the sales transaction.

Alternately, if the client portal 301 is for the purchase of content, the portal 301 may allow the user to obtain the purchased content while the portal 301 is disconnected from the network. As previously noted, merchants that provide content for the client portal 301 may keep track of a user's preferences. With this arrangement, a merchant can download content preferred by a user to the client portal 301 in such a way that the user cannot access the content until the user actually purchases the content. For example, if a merchant has recorded that the user is a frequent purchaser of Stephen King novels, the merchant can download the most recent Stephen King novel to the client portal 301. The downloaded content may be invisible to the user, or encrypted with a key that is unavailable to the user. When the user makes an offline request to purchase the content from the merchant's catalog, the user can be allowed to retrieve the already-downloaded content or provided with the key needed to decrypt the content without having to reconnect to the network. When the user does then subsequently reconnect to the network, the user's purchase of the content is then conveyed to the merchant.

Conclusion

The present invention has been described above by way of specific exemplary embodiments, and the many features and advantages of the present invention are apparent from the written description. Thus, it is intended that the appended claims cover all such features and advantages of the invention. Further, since numerous modifications and changes will readily occur to those skilled in the art, the specification is not intended to limit the invention to the exact construction and operation ad illustrated and described. For example, the invention may include any one or more elements from the apparatus and methods described herein in any combination or subcombination. Accordingly, there are any number of alternative combinations for defining the invention, which incorporate one or more elements from the specification (including the drawings, claims, and summary of the invention) in any combinations or subcombinations. Hence, all suitable modifications and equivalents may be considered as falling within the scope of the appended claims

What is claimed is:

1. A method of purchasing products through a client portal that is optimized to purchase a specific type of product, the client portal being independently managed, comprising:
   connecting the client portal to a network by the client portal having at least one preauthorized network access site as a displayable storefront which limits the use of the portal by not displaying an address line to a user for user-selectable input to access content that has not been previously stored in the client portal's memory;
   providing a user-selectable list of links to at least one available network site that offers the product that the client portal is optimized to purchase, the network site accessible to the client portal for obtaining new content, wherein the user-selectable list of links includes network sites preselected or maintained by an authorized party and provides access to the network site upon selection by the user;
   selecting a different link than the displayable storefront, from the user-selectable list of links when a user desires additional content for inclusion through the client portal;
   retrieving, based on the selecting, a vendor's catalog content from a pre-selected group of vendors, from the network into the client portal during the client portal's connection to the network and having the vendor's catalog content being seamlessly rendered, integrated and formatted for viewing through a streamlined interface that only includes the commands necessary to examine and purchase a particular type of goods or services;
   managing the client portal independent from any user-selectivity, to benefit the authorized party and the client portal's user by maintaining a list of network sites available for access by the portal and facilitating ease-of-use by seamlessly integrating the content retrieval and rendering on the client portal in a single operation, wherein maintaining the list of network sites includes including determining, updating and limiting which network sites are available for access by the client portal;
   disconnecting the client portal from the network;
   while the client portal is disconnected from the network, selecting an item for purchase from the vendor's catalog content with the streamlined interface to facilitate purchase activity and provide a user more time and an ease-of-use experience to continue with additional purchase activity;
   reconnecting the client portal to the network; and
   during the reconnection of the client portal to the network, sending a purchase request to the vendor for each of the items relating to the purchase activity of the user.

2. The method of purchasing products recited in claim 1, wherein the vendor's catalog includes
   a first electronic page including a representation of a first item available for purchase through the client portal;
   a second electronic page including a representation of a second item available for purchase through the client portal; and
   a third electronic page including a representation of a third item available for purchase through the client portal, such that the first page, the second page and the third page are configured for display by the client portal in a sequential order.

3. The method of purchasing products recited in claim 1, wherein the vendor's catalog is a catalog offering eBooks for purchase through the client portal.

4. A method of purchasing products through a client portal that is optimized to purchase a specific type of product, the client portal being independently managed, comprising:
   connecting the client portal to a network by the client portal having at least one preauthorized network access site as a displayable storefront and limiting the use of the portal by not displaying an address line to a user for user-selectable input to access content that has not been previously stored in the client portal's memory;
   providing a user-selectable list of links to at least one available network site that offers the product that the client portal is optimized to purchase, the network sites accessible to the client portal for obtaining new content, wherein the user-selectable list of links includes network sites preselected or maintained by an authorized party and provides access to the network sites upon selection by the user;
   selecting a different link than the displayable storefront, from the a user-selectable list of links when a user desires additional content for inclusion through the client portal;
   retrieving, based on the selecting, from the network into the client portal during the client portal's connection to the network both a vendor's catalog from a pre-selected group of vendors, and content offered in the vendor's catalog and having the content offered in the vendor's catalog being seamlessly rendered, integrated and formatted for viewing through a streamlined interface that only includes the commands necessary to examine and purchase a particular type of goods or services;
   managing the client portal independent from any user-selectivity, to benefit the authorized party and the client portal's user by maintaining a list of network sites available for access by the portal and facilitating ease-of-use by seamlessly integrating the content retrieval and rendering on the client portal in a single operation, wherein maintaining the list of network sites includes including determining, updating and limiting which network sites are available for access by the client portal;
   disconnecting the client portal from the network; while the client portal is disconnected from the network,
   selecting content for purchase from the content offered in the vendor's catalog with the streamlined interface to facilitate purchase activity and provide a user more time and an ease-of-use experience to continue with additional purchase activity, and
   making the selected content available for use through the client portal;
   reconnecting the client portal to the network; and
   during the reconnection of the client portal to the network, sending a purchase request to the vendor for each of the items relating to the purchase activity of the user.

5. The method of purchasing products recited in claim 4, wherein the vendor's catalog includes
   a first electronic page including a representation of a first item available for purchase through the client portal;
   a second electronic page including a representation of a second item available for purchase through the client portal; and a third electronic page including a representation of a third item available for purchase through the client portal, such that the first page, the second page and the third page are configured for display by the client portal in a sequential order.

6. The method of purchasing products recited in claim 4, wherein the vendor's catalog is a catalog offering eBooks for purchase through the client portal.

* * * * *